United States Patent [19]

Keskula

[11] Patent Number: 5,267,542
[45] Date of Patent: Dec. 7, 1993

[54] ELECTRONIC CONTROL MODULE

[75] Inventor: Donald H. Keskula, Norwich, United Kingdom

[73] Assignee: Delco Electronics Corporation, Kokomo, Ind.

[21] Appl. No.: 809,712

[22] Filed: Dec. 17, 1991

[30] Foreign Application Priority Data

Jan. 5, 1991 [GB] United Kingdom ............... 9100205

[51] Int. Cl.$^5$ .................................................. F02P 5/15
[52] U.S. Cl. ........................................ 123/417; 123/480
[58] Field of Search ............. 123/416, 417, 478, 480; 364/431.03, 431.04, 431.05, 431.06, 431.07, 431.08

[56] References Cited

U.S. PATENT DOCUMENTS

| | | | |
|---|---|---|---|
| 4,485,784 | 12/1984 | Fujii et al. ...................... 123/417 X |
| 4,489,689 | 12/1984 | Avian et al. ...................... 123/417 |
| 4,532,592 | 7/1985 | Citron et al. ................... 123/417 X |
| 4,762,105 | 8/1988 | Beyer et al. ........................ 123/417 |
| 4,845,667 | 7/1989 | Hoptner et al. ..................... 364/900 |
| 4,884,204 | 11/1989 | Seibt et al. ...................... 364/431.03 |
| 4,886,030 | 12/1989 | Oba et al. ....................... 123/417 X |
| 4,890,592 | 1/1990 | Furuyama et al. ................ 123/417 |
| 4,893,244 | 1/1990 | Tang et al. ..................... 123/417 X |
| 4,928,652 | 5/1990 | Shinya et al. ..................... 123/417 |
| 4,933,862 | 6/1990 | Wataya ........................ 364/431.06 |
| 5,001,642 | 3/1991 | Botzenhardt et al. ........... 123/417 X |

FOREIGN PATENT DOCUMENTS

| | | |
|---|---|---|
| 2104247A | 3/1983 | United Kingdom . |
| 2172715A | 9/1986 | United Kingdom . |
| 2173611A | 10/1986 | United Kingdom . |
| WO80/005-97A1 | 4/1980 | World Int. Prop. O. . |

Primary Examiner—Willis R. Wolfe
Attorney, Agent, or Firm—A. Frank Duke; Mark A. Navarre

[57] ABSTRACT

An electronic control module for use in controlling a vehicle comprises a first processor 10 adapted to calculate the fuelling requirements of the engine and spark advance, and also to control a plurality of diagnostic tests for testing engine operating paramenters. A second processor 12 triggers the spark and spark dwell timing together with the start of fuel injection. By such partitioning of tasks, it is possible to provide a wide variety of facilities with a low cost electronic control module. The second processor 12 is adapted to operate the engine in a back-up mode on failure of the first processor 10 by use of look-up tables for fuel pulse width and spark advance. The vehicle therefore remains operational even on failure of part of the electronic control module.

9 Claims, 2 Drawing Sheets

ELECTRONIC CONTROL MODULE

FIELD OF THE INVENTION

This invention relates to an electronic control module for use in controlling the operation of a vehicle, and in particular to an electronic control module comprising two or more processors.

BACKGROUND OF THE INVENTION

One known type of electronic control module is a high cost module providing a large range of facilities and uses a sophisticated microprocessor for carrying out all the control tasks of the module.

Another known type of electronic control module is a low cost module, for use in cheaper vehicles, which only provides some of the features of the more expensive version. This electronic control module uses a less sophisticated, and thus less expensive, microprocessor.

Recently, attempts have been made to provide a low cost, high function control module. GB-A-2,173,611 discloses an electronic control module in which two microprocessors share the various tasks of the control module and can also provide a back-up facility when one of the processors fails. The tasks have generally been divided so that one of the processors deals with fuel injection and the other with spark ignition.

A problem with such a division of the tasks is that the processors need to communicate between one another a substantial amount and some of the data communicated is time critical, which requires a high-speed communications line.

Furthermore, both processors must carry out both time critical and non-time critical operations which makes their programming more complex and requires both of the processors to be of a greater capacity than is otherwise necessary.

Another problem, as a result of both processors being connected to a plurality of auxiliary components, is that both processors are equally as likely to fail, which requires a complex back-up system to detect failure of one of the processors and effectively to replace it.

The present invention seeks to provide an improved electronic control module.

According to an aspect of the present invention, there is provided an electronic control module for a vehicle comprising a first processor adapted to calculate fuelling requirements of the engine and spark advance on the basis of engine operating conditions, and a second processor adapted to initiate fuel injection and ignition on the basis of engine position.

By dividing the tasks so that one processor carries out the required calculations and the other the triggering of fuel injection and start of combustion, it is possible to reduce significantly the amount of processing that is required. It is therefore possible to use significantly simpler processors.

Another advantage of this arrangement is that, in appropriate embodiments, it will not be necessary to access the second processor. Thus, an engine or powertrain calibration engineer, for example, would only have to access the first processor, making his task considerably simpler. Furthermore, this can also reduce the cost of the module significantly since an on-board ROM can be used for the second processor rather than an expensive EPROM or other such memory.

Furthermore, it is possible to ensure that the tasks and auxiliary components which are most likely to fail are only associated with the first processor, so if a back-up facility is to be provided, this can be done in connection with the second processor only, making the facility relatively simple to implement.

Preferably, there are only two processors.

The first processor may also be adapted to control the idle speed of the engine.

Preferably, the second processor is adapted to determine spark dwell timing on the basis of engine position and engine operating conditions. Thus, the second processor can be thought of as providing timing triggers, while the first processor carries out the required calculations, together with the functions requested and calibrated by the customer, or service engineer.

The electronic control module may also include a back-up mode to enable it to continue operating even on failure of the first processor or of any of the components associated with the first processor. Thus, in an embodiment, the electronic control module comprises means to generate a check signal representative of the state of operation of the first processor and/or of any components associated with the first processor, the second processor being adapted to control the operation of the engine when the check signal indicates failure of the first processor and/or of any components associated with the first processor.

In a practical embodiment, there may be provided a first memory containing data representative of fuelling requirements at a plurality of engine speeds, the second processor being adapted to access the first memory on failure of the first processor and/or of any components associated therewith. There is preferably also a second memory containing data representative of spark advance at a plurality of engine speeds, the second processor being adapted to access the second memory on failure of the first processor and/or of any components associated therewith In a preferred embodiment, the data representative of fuelling requirements and spark advance is based on engine speed and also on engine load, represented for example by throttle position The first and second memories may be incorporated in the same physical memory, and are preferably incorporated in the second processor.

Failure of the first processor is generally more likely due to the variety of functions it has to perform and due to the components to which it is connected.

An embodiment of the present invention is described below, by way of illustration only, with reference to the accompanying drawings, in which.

Only the components and input/output lines necessary for describing this embodiment are shown. Other components and input/output lines may be provided of the type well known in the art.

Figure 1:
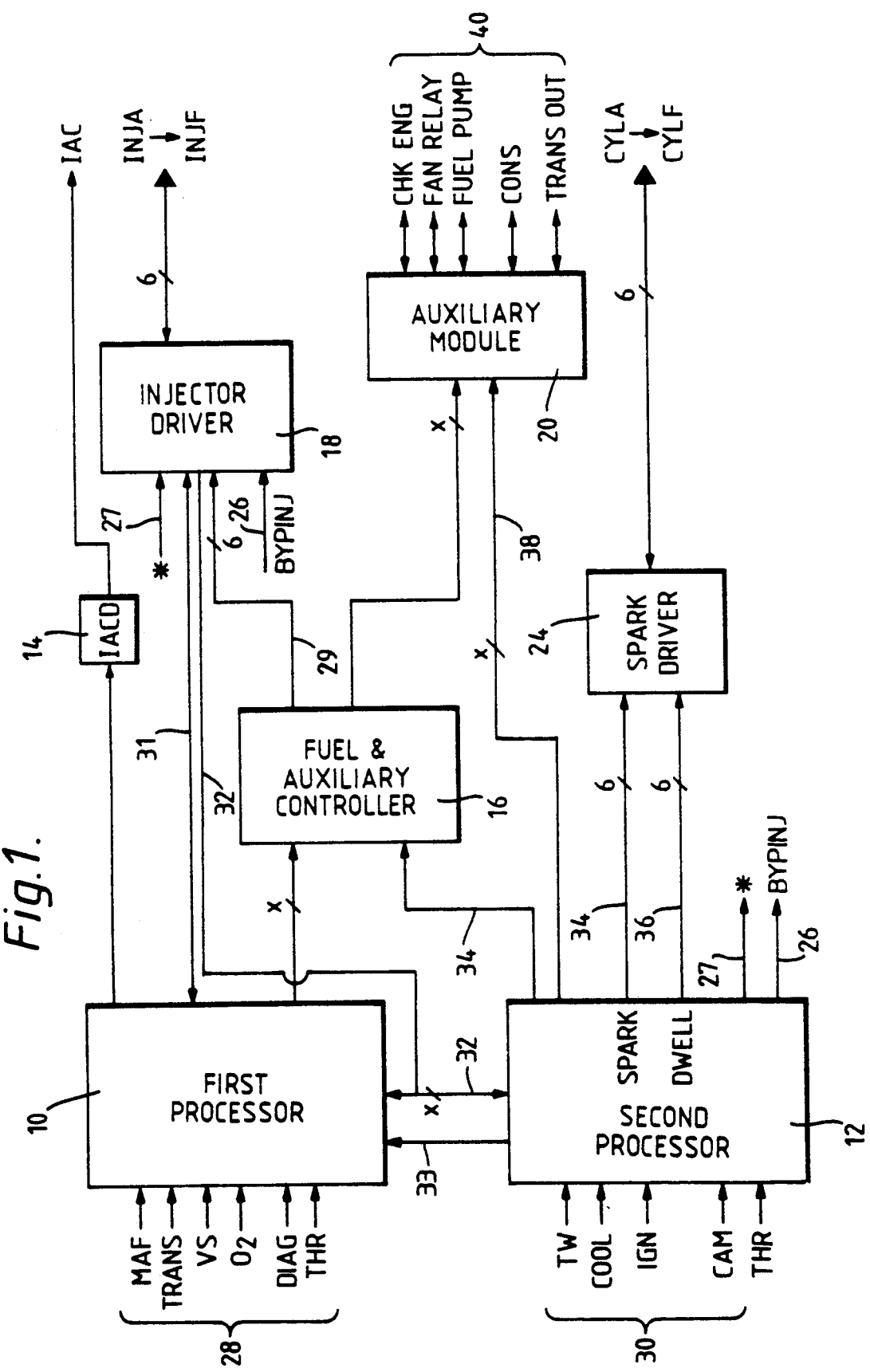
FIG. 1 shows a block diagram of an embodiment of electronic control module.

Referring to FIG. 1, an electronic control module (hereinafter referred to as ECM) is provided with first and second processors 10 and 12 respectively, of any suitable type. The tasks of the ECM are divided between the first and second processors 10, 12 such that the first processor 10 executes the variable algorithms, for example fuel and spark calculations and the customer calibrated functions, while the second processor 12 acts as a timer and input/output device, obtaining speed information from an engine position sensor such as a toothed crankshaft wheel, and triggering the spark plugs and the start of fuel injection. Thus, during normal operation, the first processor 10 can be thought of as a master processor which carries out all the variable calculations, while the second processor 12 can be thought of as a slave processor which supplies hardware generated timing signals obtained from one or more sensors.

The first processor 10 is connected to an idle air control driver 14, which is adapted to set the idle speed of the engine, and to an EPROM (not shown) which provides the necessary storage memory for use by the first processor 10.

Also connected to the first processor 10 is a fuel and auxiliary controller 16 which controls the fuel injectors INJ$a$-INJ$f$, through an injector driver 18. The controller 16 also controls, through an auxiliary module 20, auxiliary devices associated with the vehicle engine and the diagnosis of a plurality of vehicle operating parameters.

The fuel and auxiliary controller 16 is connected to the second processor 12 for the receipt of a timing trigger for use in commencing fuel injection.

The second processor 12 is connected to the spark plugs CYL$a$-CYL$f$ through a spark driver 24. An output line 26, marked BYPINJ, is also provided from the second processor 12 to the injector driver 18 for controlling a back-up fuel supply during periods when the first processor 10 is inoperative. This is described in further detail below.

The second processor 12 comprises an in-built memory (not shown) which includes read-only memory (ROM), random access memory (RAM) and EEPROM.

A clock (not shown) provides a 2 MHz clock signal for driving the first and second processors 10,12. In an alternative embodiment, the first processor 10 is driven at 2 MHz while the second processor 12 is driven at 3 MHz. With microprocessors having in-built clock circuitry, a crystal of suitable frequency is connected to the first processor 10 and the clock output of the first processor 10 is connected to the second processor 12 for use thereby.

The ECM comprises a number of inputs and outputs, a first plurality of inputs 28 being fed into the first processor 10 to supply it with a variety of engine operating parameters from a plurality of appropriate sensors, of the type well known in the art. These are used in controlling the idle speed of the engine, calculating the amount of fuel to be delivered to each cylinder, the amount of spark advance (for which data obtained from the second processor 12 is used), controlling the auxiliary functions and the vehicle diagnostic procedures. Other standard inputs may also be provided to the first processor.

Of the inputs shown, MAF is the signal from a mass air flow sensor and is used in controlling, principally, the amount of fuel delivered to the cylinders and the amount of spark advance. TRANS is a signal from a transmission controller which indicates whether the engine torque is too high for the transmission, in which case the first processor 10 will command a reduction in the load being imposed on the transmission (by means of a reduction in fuel or in the spark advance) until the signal TRANS indicates that the engine is operating again within acceptable limits. The TRANS signal is particularly useful for automatic transmissions during changes from one gear ratio to another.

The signal VS is representative of vehicle speed, while $O_2$ is a signal from an oxygen sensor and is representative of the amount of oxygen in the exhaust. There may be a plurality of such oxygen sensors for measuring the amount of oxygen in a plurality of different parts of the exhaust. DIAG is a signal which places the electronic control module into a diagnostic mode for carrying out a series of diagnostic tests on the vehicle, in a manner known in the art.

The signal THR is representative of throttle position and is used as an indication of engine load in calculating the fuelling requirements and amount of spark advance. Other indicators may be used for load in addition to throttle position, as is well known in the art.

The first processor 10 also has access to the inputs and outputs of the auxiliary module 20, the principal ones of which are shown in FIG. 1. These include a CHK ENG line which is typically connected to a lamp which is lit to inform the driver that there is a serious malfunction of the engine. The FAN RELAY line is used in operating and in checking the state of the fan relay, while the FUEL PUMP line is used in operating and in checking the state of the fuel pump. The CONS line is used to give an indication of the fuel consumption, while the TRANS OUT line is used to indicate to the transmission controller the expected load which will be placed on the transmission in subsequent engine cycles, and thereby to enable the transmission controller to warn the ECM in advance if the transmission is going to be over-loaded.

The other described inputs to the ECM are supplied to the second processor 12, shown as a second set of inputs 30. These inputs comprise a signal TW from a toothed wheel fitted to the engine crankshaft which is adapted to give an indication of engine position and speed for use in controlling spark timing and the initiation of fuel injection. A signal COOL originates from a temperature sensor disposed to measure the temperature of the engine coolant and thereby to give an indication of engine load and is used by the first processor 10 in calculating fuelling requirements and spark advance. This signal can also be used to shut off the engine when the temperature exceeds a predetermined level. CAM is the signal from a camshaft position sensor.

The input IGN is the vehicle ignition voltage. It can be used to switch off automatically some of the ECM functions if the battery voltage drops below a predetermined level. For example, it may be used to disable the idle air control driver 14 and the air conditioning facility, and also to give a suitable warning to the driver. The disabling of the idle air control driver 14 is readily carried out by changing the signal on an enable line (not shown) connected between the second processor 12 and the driver 14. In the preferred embodiment, the idling speed to which the driver 14 was set immediately before being disabled by the second processor 12 is retained, for use as a preset idling speed during such conditions.

As will become apparent below, the FAN RELAY line and the FUEL PUMP are of the auxiliary module 20 are controlled by the second processor 12 in order that they can be operational in the back-up mode.

The idle air control driver 14 is the only engine running component which the first processor 10 controls directly. The other engine running components, such as the fuel injectors and the spark plugs, which require precise timing triggers, are not controlled directly by the first processor 10, but rather by the fuel and auxiliary controller 16 and the second processor 12.

A plurality of the signals 30 input into the second processor 12 are sent to the first processor 10 for use in calculating fuelling requirements and spark advance. This is achieved by means of a set of communication lines 32 which are connected between the two processors 10, 12, and also between the first processor 10 and the injector driver 18. In practice, the communication lines 32 are in the form of a serial data bus which is controlled solely by the first processor 10.

Data transfer between the two processors 10, 12 is effected between two buffer memories, each associated with a respective processor. As the first processor 10 produces data, it feeds into its associated buffer memory, in a preset order, data representative of spark advance and a COP signal representative of the state of operation of the first processor 10 and of the components associated with it. On the other hand, as the second processor 12 receives data, it feeds into its associated buffer memory, in a preset order, data representative of the coolant temperature COOL, the ignition voltage IGN and also of the state of operation of the spark plugs, obtained from a signal from the spark driver 24, and a fuel disable signal when it is deemed not desirable to inject any fuel into a cylinder.

The transfer of data is controlled in such a manner that when the first processor 10 deems it appropriate to send or receive data, it sends the item of data at the top of its buffer memory to the second processor 12, which automatically returns the item at the top of its associated buffer memory. Since all the data passed between the two processors is in a preset order, it is not necessary for there to be any handshaking as both processors will know what information they are receiving. Furthermore, since the data transferred between the two processors does not include any timing triggers, the data can be transferred at the convenience of the first processor 10.

It is possible to disable the communication lines 32 in the event of failure of the first processor 10 and/or of any of the components associated with it, determined by the state of the check signal COP sent from the first processor 10 to the second processor 12 on the communication lines 32. This enables the second processor 12 to operate the engine in a back-up mode, as will be described below.

A timing signal representative of the crankshaft wheel signal TW is sent on a separate line 33 from the second processor 12 to the first processor 10 in order to keep the communication lines between the two processors 10, 12 simple. This timing signal is used by the first processor 10 to calculate the speed of the engine, which is then used in determining fuel requirements and spark advance.

Figure 2:
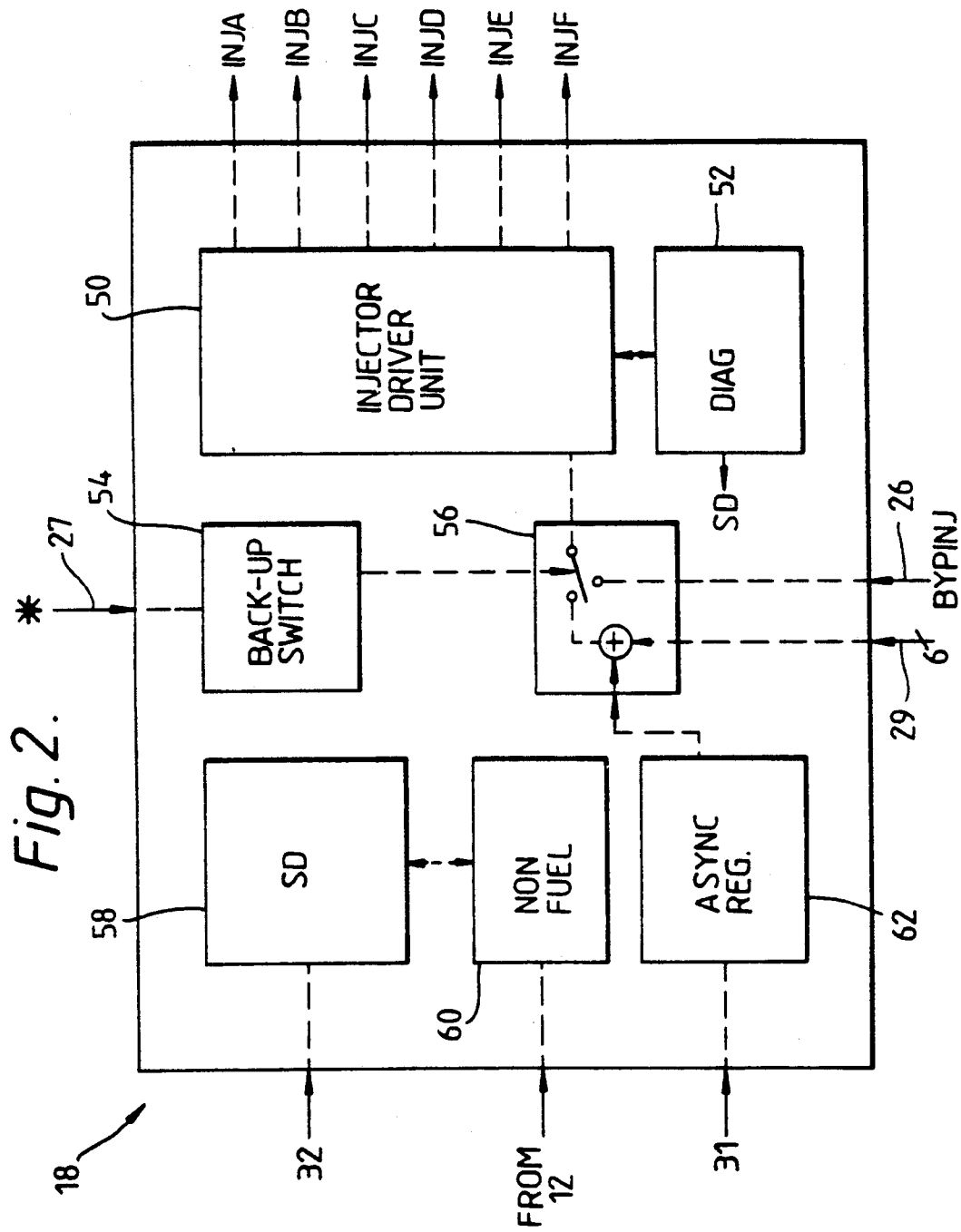
FIG. 2 shows a schematic diagram of an embodiment of injector driver of the electronic control module of FIG. 1.

The principal components of the injector driver 18 are shown in block form in FIG. 2. An injector driver unit 50 is connected to each of the fuel injectors INJ$a$ to INJ$f$ and is adapted to actuate the fuel injectors. A diagnostics unit 52 is adapted to determine the state of operation of the fuel injectors INJ$a$-INJ$f$ and to generate an appropriate signal on incorrect operation of one or more of the injectors. A back-up switch 54 is controlled by fault line 27, marked with an asterisk, for switching the injector driver 50 to respond only to the BYPINJ signal when in the back-up mode, or to the asynchronous/synchronous fuelling unit 56 which is connected both to the lines 29 from the fuel and auxiliary controller 16 and to the line 31 through an asynchronous register 62. During normal operation, the asynchronous/synchronous fuelling unit 56 is set for normal operation and receives data from the fuel and auxiliary controller 16, while in the back-up mode it is set for back-up (BYPINJ) operation and is connected to the second processor 12 via the line 26.

A serial data unit 58 is connected by the communication lines 32 to the first processor 10 for receipt of a control register word from the first processor 10 used in controlling an asynchronous register connected to asynchronous fuelling line 31 from the first processor 10. This line 31 is used by the first processor 10 to deliver a fuel enhancement pulse, which is in the form of a width modulated pulse, for use in increasing engine output in response to a throttle demand, or other load demand. In order to ensure that the desired enhancement does actually take effect, the serial data unit 58 is adapted to return to the first processor 10 a signal indicative of whether the entire of the fuel enhancement signal has been used as a fuel pulse, or whether part or all of this signal has been obscured by the standard fuel pulse sent by the fuel and auxiliary controller 16, in which case there would not be the desired enhancement in engine output.

The non-fuel unit 60 is controlled by the second processor 10 and disables the injector driver 18 temporarily when it is determined that it is desirable not to supply any fuel to one or more of the cylinders. However, in the preferred and described embodiment, this unit is not included in the injector driver 18. Instead, the first processor 10 is responsible for commanding the disablement of fuel and does this on the basis of a signal 33 from the second processor 12.

The injector driver 18 is also responsible for monitoring the operation of the injectors INJ$a$-INJ$f$ and for sending data representative of the state of operation thereof to the first processor 10, on line 31. Appropriate action can then be taken by the first processor 10 when an injector is not functioning correctly.

During normal running of the vehicle engine, the first processor 10 calculates the amount of fuel that needs to be delivered to each cylinder on the basis, primarily, of engine speed (calculated from the reference signal on line 33), mass air flow MAF, coolant temperature COOL, throttle position THR and the amount of oxygen $O_2$ measured by the oxygen sensor. The results of the calculation are then transferred under control of the first processor 10 to the fuel and auxiliary controller 16 by means of a parallel bus.

The fuel and auxiliary controller 16 then controls the actual amount of time during which the injectors are operative by sending appropriate signals on lines 29 to the injector driver 18.

During each engine cycle, the first processor 10 also calculates the desired amount of spark advance on the basis of the engine speed determined by the signal sent on line 33 and the signals MAF, COOL, IGN and others well known in the art. It then sends on line 32 the result of this calculation to the second processor 12 for use in triggering the spark plugs. When the engine is idling, the first processor 10 controls the amount of air supplied to the cylinders through the idle air control driver 14.

Additionally, at appropriate times during the operation of the vehicle, the first processor 10 controls the auxiliary module 20 to carry out the diagnostic tests provided with the ECM, in known manner.

On the other hand, the second processor 12 carries out the basic triggering or timing functions for the ECM. It triggers and controls the initiation of the spark (at the time determined from the first processor 10) and spark dwell timing on the basis of the engine position and speed, given by the signal TW from the crankshaft wheel.

The operation of the spark plugs is monitored by the spark driver 24 which sends feedback signals from each of the spark plugs to the second processor 12.

The second processor 12 also triggers the start of fuel injection, by sending on line 34 an appropriate fuel enable signal (obtained from the crankshaft wheel signal TW and the camshaft signal CAM) to the fuel and auxiliary controller 16. However, in the event that it is determined that it is not desirable to operate any of the fuel injectors, the second processor 12 can send a fuel disable signal to the first processor 10 on the communication lines 32.

The second processor 12 also controls the enabling of the idle air control driver 14 by means of a separate line (not shown) such that in the back-up mode, or when the ignition voltage IGN is too low, the idle air control driver 14 is disabled.

The second processor 12 could also send the enable signal to the first processor 10 in embodiments in which the enable line of the controller 14 is connected to the first processor 10.

In addition to the above triggering functions, the second processor 12 provides back-up fuel and spark signals on failure of the first processor 10 and/or of any of the components associated with it. Such failure is determined to have occurred when the second processor 12 fails to receive the check signal COP from the first processor 10, or if the received COP signal is corrupted or otherwise indicates the need for the ECM to switch to the back-up mode. In this event, the first processor 10 and the fuel and auxiliary controller 16 are disabled, by means of a signal output on fault line 27, and the second processor 12 then initiates a back-up routine which controls spark timing and fuel delivery.

In this back-up routine, the second processor 12 also disables the idle air control driver 14 so that the idling speed to which the driver 14 was set immediately before being disabled is then used as the idling speed during the back-up mode.

The fault line 27 also acts to shut-off the auxiliary module 20, apart from the CHK ENG, FAN RELAY and FUEL PUMP lines which are accessed by the second processor 12 via three auxiliary lines 38. In this mode, the CHK ENG line is set to an 'on' state by the default of the first processor 10 or the fuel and auxiliary controller 16 for use in lighting, for example, an appropriate symbol on the instrument panel of the vehicle to warn the driver that there is a problem with the engine. Of course, any other fault indicator may be used, including an acoustic signal. In this embodiment, the second processor 12 will also command the feeding of a fault signal on the CHK ENG line when it is determined that there has been a failure of the fuel pump and/or the fan relay, even during normal operation of the ECM (in which case this is done via the first processor 10).

At the same time, the fault line 27 sets the injector driver 18 into the back-up mode for receipt of back-up fuel pulses from the second processor 12 sent on line 26 (BYPINJ).

The second processor 12 determines the spark timing on the basis of a spark advance value obtained from a look-up table stored in the memory of the second processor 12 in dependence upon a measure of engine speed derived from the crankshaft wheel signals TW. The look-up table may be a three-dimensional look-up table, requiring also a measure of engine load, obtained from, for example, throttle position THR. In some embodiments, the spark advance may also be modified as a function of the coolant temperature COOL.

In the preferred embodiment, the spark advance values are based on the values which would be used with a 91 octane fuel. These values give a relatively late spark advance and therefore can enable the back-up control to be relatively straightforward and safe.

Fuel delivery in the back-up mode is controlled on the basis of the engine speed, coolant temperature COOL and throttle position THR, which are used to obtain a value indicative of the amount of fuel to be injected into the engine from a second look-up table stored in the memory of the second processor 12.

In the preferred embodiment, fuel is delivered to all the cylinders at the same time in the back-up mode in order to simplify the back-up mode.

The second processor 12 can thus enable the engine to operate in what could be thought of as a "limp home" mode upon failure of the first processor 10 or part of the ECM to enable the vehicle still to be driven.

The partitioning of the tasks between the first and second processors 10, 12 in the manner described above generally enables the second processor 12 to control knock in the engine. This can be achieved by means of one or more knock sensors connected to the second processor 12 which makes use of the signal from the sensor(s) to adjust the spark advance obtained from the first processor 10. Such knock control could be adapted to control each cylinder independently or could, for a more simple system, control all the cylinders so that the spark advance values for all the cylinders are adjusted by an equal amount.

Furthermore, this partitioning of the tasks enables the first processor 10 to be the only processor which has to be accessed by a calibration engineer, the second processor 12 effectively being hidden within the ECM. Since the tasks of the first processor 10 are generally not time critical, this further simplifies the calibration tasks of the calibration engineer, and also any re-programming due to improvements or other changes to the ECM.

The embodiments of the invention in which an exclusive property or privilege is claimed are defined as follows:

1. An electronic control module for a vehicle comprising a first processor adapted to calculate fuelling requirements of the engine and spark advance on the basis of engine operating conditions, and a second processor adapted to initiate fuel injection and ignition on the basis of engine position.

2. An electronic control module according to claim 1, wherein the first processor is adapted to control the idle speed of the engine.

3. An electronic control module according to claim 1 or 2, wherein the second processor is adapted to determine spark dwell timing on the basis of engine position and engine operating conditions.

4. An electronic control module according to claim 1, wherein the first processor is adapted to control one or more diagnostic tests carried out on the engine.

5. An electronic control module according to claim 1, comprising a fuel controller adapted to control a plurality of fuel injectors, the first processor being adapted to control the fuel controller.

6. An electronic control module according to claim 5, wherein the second processor is connected to the fuel controller and is adapted to trigger the start of fuel injection.

7. An electronic control module according to claim 1, comprising means to generate a check signal representative of the state of operation of the first processor and/or of any components associated with the first processor, the second processor being adapted to control the operation of the engine when the check signal indicates failure of the first processor and/or of any components associated with the first processor.

8. An electronic control module according to claim 7, comprising a first memory containing data representative of fuelling requirements at a plurality of engine speeds, the second processor being adapted to access the first memory on failure of the first processor and/or of any components associated with the first processor.

9. An electronic control module according to claim 7, comprising a second memory containing data representative of spark advance at a plurality of engine speeds, the second processor being adapted to access the second memory on failure of the first processor and/or of any components associated with the first processor.

* * * * *